Sept. 7, 1965  R. P. ROETTER ETAL  3,205,056
METHOD AND APPARATUS FOR PRODUCING ALL-GLASS
MULTIPLE SHEET GLAZING UNITS
Filed Oct. 31, 1960  7 Sheets-Sheet 1

INVENTORS
Robert P. Roetter and
BY Frederick C. Brill

Nobbe & Swope
ATTORNEYS

INVENTORS
Robert P. Roetter and
BY Frederick C. Brill
Nobbe & Swope
ATTORNEYS

Sept. 7, 1965   R. P. ROETTER ETAL   3,205,056
METHOD AND APPARATUS FOR PRODUCING ALL-GLASS
MULTIPLE SHEET GLAZING UNITS
Filed Oct. 31, 1960   7 Sheets-Sheet 5

INVENTORS
Robert P. Roetter and
BY Frederick C. Brill
Nobbe & Swope
ATTORNEYS

Sept. 7, 1965     R. P. ROETTER ETAL     3,205,056
METHOD AND APPARATUS FOR PRODUCING ALL-GLASS
MULTIPLE SHEET GLAZING UNITS
Filed Oct. 31, 1960     7 Sheets-Sheet 6

INVENTORS
Robert P. Roetter and
Frederick C. Brill
BY
Hobbe & Swope
ATTORNEYS

Sept. 7, 1965   R. P. ROETTER ETAL   3,205,056
METHOD AND APPARATUS FOR PRODUCING ALL-GLASS
MULTIPLE SHEET GLAZING UNITS
Filed Oct. 31, 1960   7 Sheets-Sheet 7

INVENTORS
Robert P. Roetter and
BY Frederick C. Brill

Nobbe & Swope
ATTORNEYS

United States Patent Office 3,205,056
Patented Sept. 7, 1965

3,205,056
METHOD AND APPARATUS FOR PRODUCING ALL-GLASS MULTIPLE SHEET GLAZING UNITS
Robert P. Roetter, Perrysburg, and Frederick C. Brill, Toledo, Ohio, assignors to Libbey-Owens-Ford Glass Company, Toledo, Ohio, a corporation of Ohio
Filed Oct. 31, 1960, Ser. No. 66,296
6 Claims. (Cl. 65—58)

The present invention relates broadly to the manufacture of all-glass multiple sheet glazing units and more particularly to an improved method of and apparatus for producing such units.

The general type of glazing unit with which this invention is concerned comprises spaced, parallel sheets of glass that are sealed together around their edges to form a dead-air space between the sheets which air space may be filled with dehydrated air or other gases before being hermetically sealed. Such multiple glass sheet glazing units are well known and have been widely used to reduce heat transfer and to prevent condensation of moisture upon the glass in glazed openings.

In general, in the present method of manufacturing all-glass multiple sheet glazing units, two sheets of glass are arranged in spaced, parallel face-to-face relation in a vertical position and conveyed through a furnace along a predetermined path. In sequentially occurring operations, the individual edge portions of the sheets are each sealed together to form a continuous edge wall around the periphery of the unit.

A primary object of the present invention is to provide an apparatus and method for forming units of the above character wherein the sealing operations are performed at a single station, thus permitting the apparatus to be located in a relatively small area.

Another object is to provide a method and apparatus whereby the sealing operation is performed in a substantially continuous manner.

Another object of the invention is to provide a novel apparatus in which the glass sheets are sealed together in spaced sequences of movement through a sealing station in which a sealing means is moved relative to the glass sheets in alternate sequences of movement.

The invention also resides in the novel apparatus comprising a single support having a plurality of sealing units mounted thereon in which means is provided for supporting and conveying the sheets to effect the sealing of all four sides of the latter in one sealing area.

Other objects and advantages of the invention will become more apparent during the course of the following description when taken in connection with the accompanying drawings.

In the drawings wherein like numerals are employed to designate like parts throughout the same:

FIGS. 23, 24, 25 and 26 are diagrammatic views illustrating the sequentially occurring movements of the glass sheets and of the sealing units to produce an all-glass multiple sheet glazing unit in accordance with this invention.

The present invention contemplates fabricating all-glass multiple sheet glazing units in a novel manner in which a pair of glass sheets are arranged in spaced parallel relationship on a conveyor and are carried in a vertical position through a furnace wherein they are first heated to a temperature above their point of strain and then advanced to a sealing area. In the latter area, the marginal edges of one of the vertically disposed sides of the sheets are heated to a semi-plastic condition by fusion gas burners and pressed together by forming rolls carried by a movable fixture which is advanced along the vertical sides of the sheets. The softened edge portions of the sheets are thereby fused together to form an integral edge wall. Subsequently, while the fixture remains stationary, the sheets are moved relative to another set of fusion burners and forming rolls mounted on the fixture to form a second or top integral edge wall. Then, while the sheets remain stationary, the fixture is moved vertically downwardly to advance a third set of fusion burners and forming rolls along the marginal edge portions of the second vertically disposed sides of the sheets forming a third portion of the edge wall. When thus sealed to provide an upper edge wall and two side edge walls, the sheets are caused to move rearwardly and over the top of the fixture and past an additional fusion burner and pair of forming rolls to seal the lower marginal edge portions of the glass sheets.

As mentioned above, the dead-air space within the all-glass multiple sheet glazing units of the type described is provided with dehydrated air or other gases before the unit is hermetically sealed. For this purpose and as herein disclosed, a dehydrating opening is provided in the bottom edge wall as it is formed.

Figure 3:
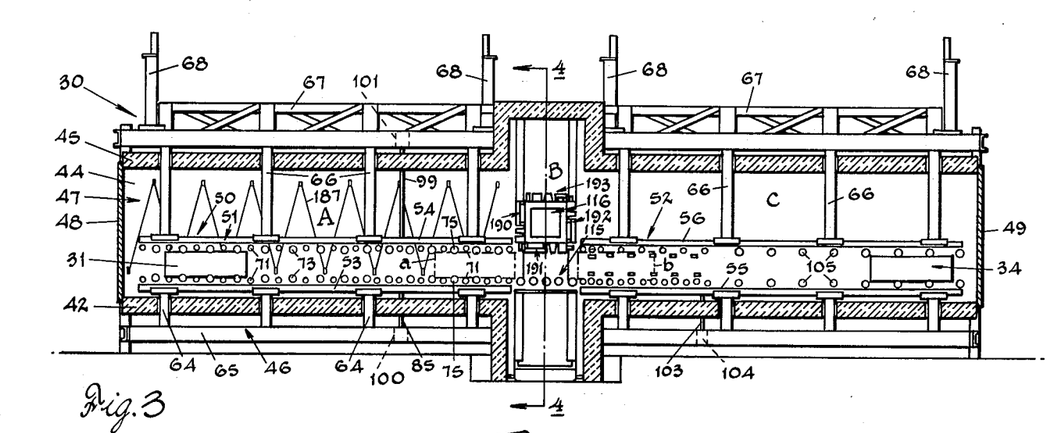
FIG. 3 is a vertical, longitudinal sectional view of an assembly apparatus, constructed in accordance with this invention.

Referring now to the drawings, and particularly to FIG. 3, the numeral 30 designates a continuous tunnel-type furnace in which pairs 31 of spaced glass sheets 32 and 33 are introduced and in which the marginal edge portions of the sheets are heated and fused to one another. Briefly, the furnace 30 includes a receiving and preheating area A, a sealing area B and a final area C in which the sealed glazing units 34 are annealed and cooled to normal temperature.

Figure 1:
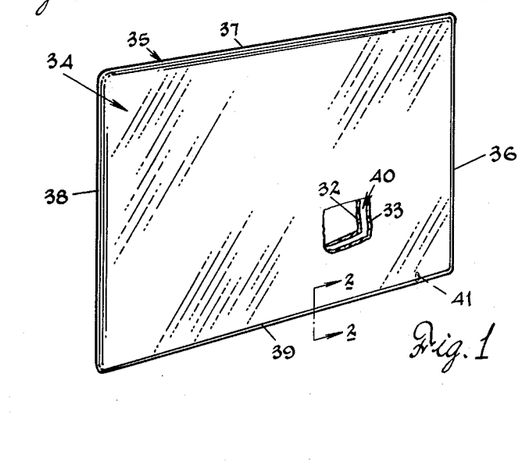
FIG. 1 is a perspective view of an all-glass multiple sheet glazing unit produced in accordance with the present invention.
Figure 2:
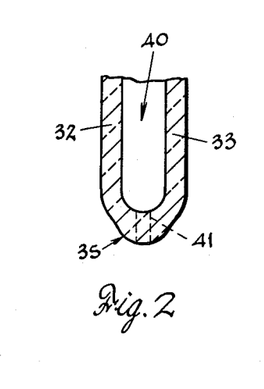
FIG. 2 is a vertical sectional view of the glazing unit taken on line 2—2 of FIG. 1.

An all-glass multiple sheet glazing unit 34, as produced according to this invention in the assembly apparatus or furnace 30, is shown in FIGS. 1 and 2 and comprises the spaced sheets of glass 32 and 33, the marginal edge portions of which are bent toward one another and fused or sealed together to form an integral edge wall 35 having vertically disposed edge portions 36 and 38 and horizontally disposed edge portions 37 and 39. Sealing the edges of the spaced sheets 32 and 33 provides an air space 40 between the sheets which is subsequently filled with dehydrated air or other gas introduced through an opening provided by a tubular element 41 sealed into the edge wall 35, which opening is then permanently closed to hermetically seal the unit.

Figures 4, 14, 18:
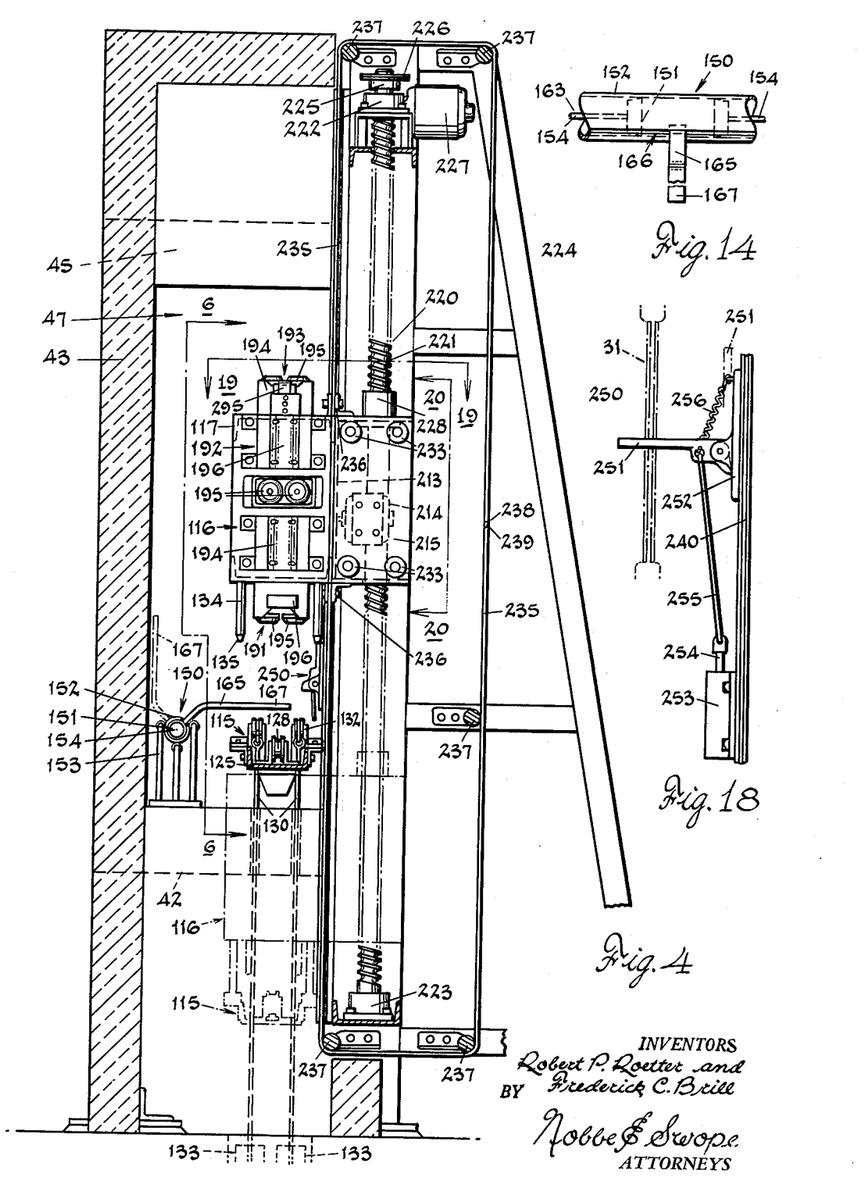
FIG. 4 is a vertical, transverse sectional view of the apparatus taken on line 4—4 of FIG. 3.
FIG. 14 is a fragmentary detail view of a glass sheet pusher device.
FIG. 18 is a vertical, transverse sectional view of a glass sheet stop device taken on line 18—18 of FIG. 6.

Referring more particularly to FIGS. 3 and 4 of the drawings, the furnace 30 comprises a continuous structure formed with a bottom wall 42, side walls 43 and 44 and a top wall 45 defining a working chamber 47 into which pairs 31 of glass sheets 32 and 33, to be sealed together, are introduced through a door 48 at the entrance end of the furnace and from which the sealed glazing units are removed through a door 49 at the exit end thereof. The furnace is supported on a framework 46 and is equipped with suitable sources of heat to effect the desired preheating of the glass sheets, as in the area A, prior to the sealing of the edge portions thereof.

As a pair of glass sheets 32 and 33 are introduced into the preheating area A of the furnace, the upper and lower edges thereof are received between a conveyor system generally designated by the numeral 50. As shown in FIG. 3, this conveyor system 50 includes an entry track section 51 and an exit track section 52. The entry and exit track sections 51 and 52 are similarly constructed and comprise lower tracks 53 and 55 and upper tracks 54 and 56 vertically spaced apart according to the vertical dimension of the glass sheets 32 and 33.

Figure 5:
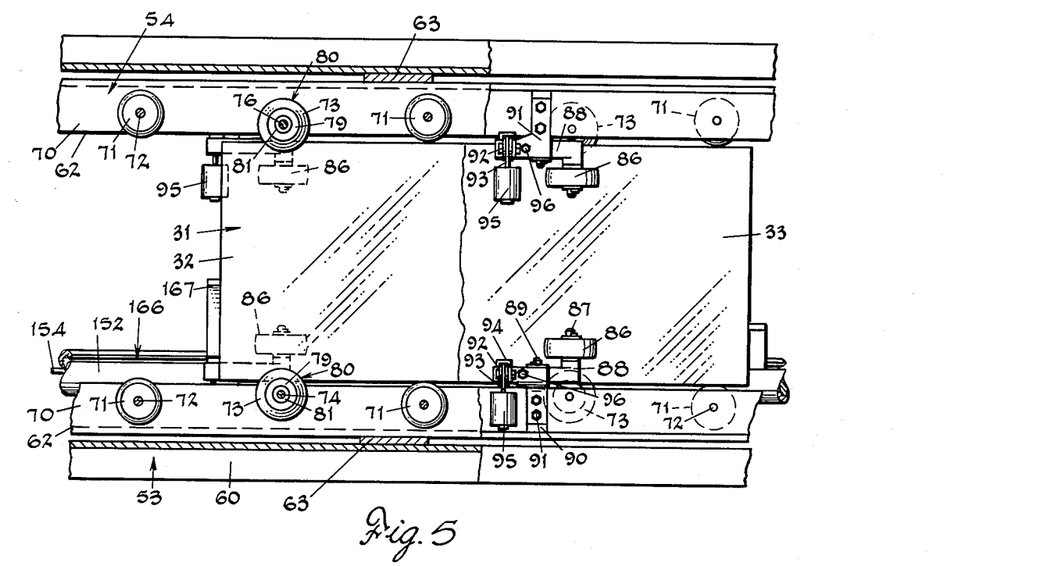
FIG. 5 is a fragmentary elevational view of the glass sheet supporting conveyor.

As shown in FIG. 5, the entry track section 51 includes upper and lower tracks 53 and 54 formed by a base channel 60 on which a pair of angle members 61 and 62 are supported by leveling pads 63. The lower channel 60 is carried by vertically disposed pedestals 64, passing through the bottom wall 42 and suitably mounted on the beams 65 of the furnace framework 46 (FIG. 3). The upper channel 60 is similarly supported by columns 66 passing through the top wall 45 and attached at their upper ends to adjustably mounted beam structures 67. In order that the apparatus may accommodate units of various sizes, lifting devices 68 are provided to raise or lower the beam structures 67, thereby adjusting the distance between the upper track 54 and the lower track 53. The upper and lower tracks 55 and 56 of the exit track section 52 are of a construction similar to that described in relation to the entry track section 51.

Figures 6, 7, 8, 10:
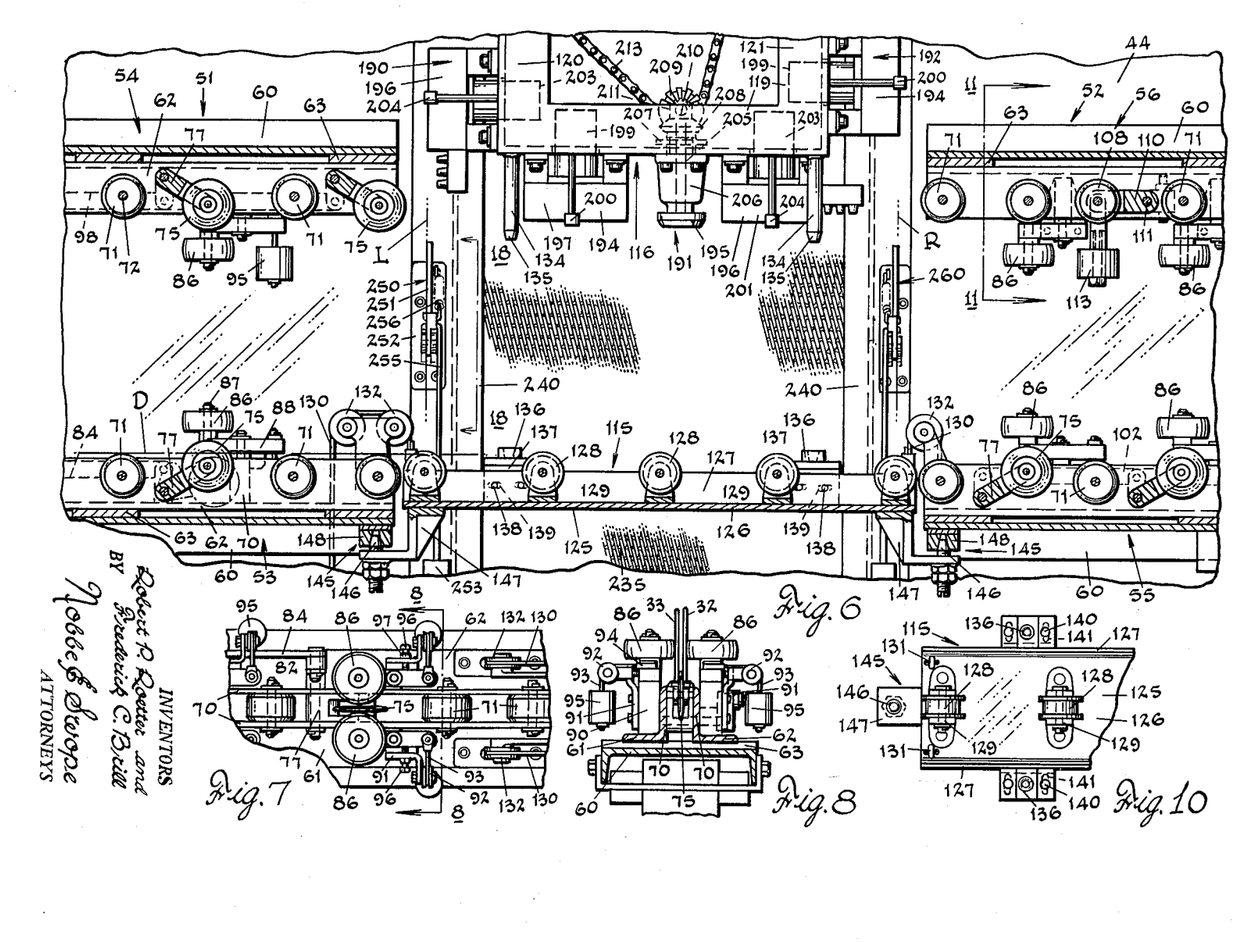
FIG. 6 is a vertical, longitudinal sectional view of the sealing area of the apparatus taken on line 6—6 of FIG. 4.
FIG. 7 is a fragmentary plan view of the glass sheet conveyor.
FIG. 8 is a vertical, transverse sectional view taken on line 8—8 of FIG. 7.
FIG. 10 is a fragmentary plan view of a support bridge of the conveyor.

The lower track 53 and upper track 54 are provided with suitably journaled rollers for movably supporting the glass sheets and also with spacing rollers that are adapted to maintain the sheets in spaced parallel relation as they are moved toward the sealing area B. For this purpose, as shown in FIG. 7, between the vertically disposed legs 70 of each angle 61 and 62, a plurality of support rollers 71 are carried on axles 72. Interposed between each of the support rollers in the preheating area, a spacing roll 73 is rotatably supported on an axle 74 (FIG. 6).

Each of the spacing rolls 73 is similarly formed with an annular flange 79 having a tapered rim 80 and an axial hub portion 81 (FIG. 5). The thickness of the flange 79 of each spacing roll is substantially equal to the desired spacing between the glass sheets to form an air space 40 of predetermined thickness between the sheets in the completed glazing unit. The spacing rolls 73 are rotatably supported on their axles 74 between the vertical legs 70 so that the lower edges of the glass sheets will not ride on the peripheries of the hubs 81 but will be supported thereabove on the peripheral surfaces of the support rolls 71 arranged alternately therebetween.

It will be appreciated that after the top and/or the bottom portions 37 and 39 of the edge wall have been formed, the spacing rolls 73 are no longer required and, moreover, would interfere with the movements of the unit back and forth along the tracks. In order that the finished edge portion may ride upon the rollers 71, spacing rolls 75 adjacent the sealing area are mounted to swing between an operating position wherein the flange 79 projects beyond the peripheral surfaces of the rollers 71 to perform the function of spacing the sheets and an out of the way position wherein the flange is retracted behind the peripheral surfaces.

Figure 9:
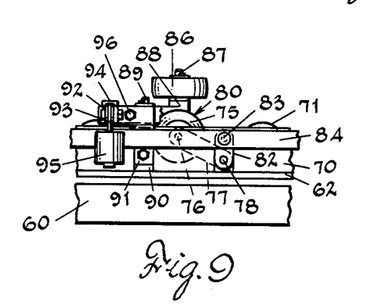
FIG. 9 is a fragmentary side view of a detail of the conveyor.
Figure 11:
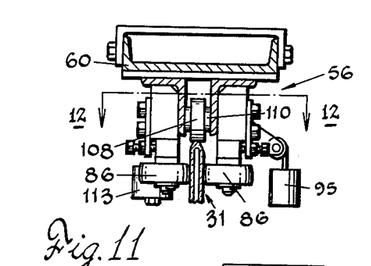
FIG. 11 is a vertical, transverse sectional view of another section of the glass sheet conveyor taken on line 11—11 of FIG. 6.

To this end, the spacing rolls 75 are supported by axles 76 journaled in bifurcated arms 77 pivotally joined at their opposite ends on shafts 78 journaled in the legs 70 of the angles 61 and 62 (FIG. 9). By means of the arms 77, the rolls 75 are adapted to be lowered from an operative position shown in full line in FIG. 9 to an inoperative, out of the way position, indicated in broken line in FIG. 9. To move the rollers between the operative and inoperative positions, the arm 77 is equipped with a lever 82 connected to a link 84 by means of a pin 83. The link 84 is operated on the lower track 53 of the entry section 51 by a rod 85 passing through the bottom wall of the furnace. Similarly, the spacing rolls associated with the upper track 54 of the entry section 51 are moved into and out of the operative position by means of a link 98 and a rod 99 passing through the upper wall of the furnace. If desired, the rod 85 may be operated by cylinder 100 mounted on the framework beams 65 while the rod 99 in a like manner can be operated by a cylinder 101 carried by the adjustable structure 67. The movable spacing rollers 75 associated with the lower track 55 of the exit track section 52 are operated by a link 102 connected to a rod 103 operated by a cylinder 104.

To lightly maintain the inwardly directed surfaces of the sheets' edges against the flange 79 of the spacing rollers 73 or 75, a pair of weighted rollers 86 are associated with each of the spacing rolls 73 or 75 to engage the sheets in rolling contact with the outwardly directed surfaces thereof. As best seen in FIGS. 5, 6 and 7, each roller 86 is rotatably mounted on a vertically disposed rod 87 secured at its lower end in a lever 88. Medially of its length, each lever 88 is pivotally supported on an axle 89 mounted in a bracket 90 affixed to the outer surfaces of the vertical legs 70 of the angles 61 and 62. The levers 88 are weighted against outward motion and adjustably restrained from undesired inward motion. For this purpose, each bracket 90 is equipped with a right angle plate 91 which on its outwardly directed leg mounts a ball-bearing grooved roller 92. A cable 93, trained about the grooved roller, is attached at one end by a clip 94 to the lever 88 and at its opposite end carries a weight 95. The normal action of weight 95, to swing the lever 88 and roller 86 inwardly, is restricted by a set-screw 96 threaded through the other leg of the plate 91 and provided with a lock-nut 97. The set-screws maintain the rollers 86 in position to support a pair of spaced glass sheets against the flanges 79 of the spacing rolls 73 and 75 while the weights 95 act to permit slight movement of the rollers from one another whenever the actual thickness of the glass sheets varies for one reason or another.

As will be explained in the description of the actual edge sealing operation, at the time that the top edge portions of the glass sheets 32 and 33 are moved relative to the upper track 56 of the exit conveyor section 52, the edge wall 37 will have been formed and there will be no necessity for providing spacing rolls. However, in a further sequential step in the operation, the partially completed unit 34 is moved rearwardly or back into the end of the preheating area A adjoining the sealing area B. During this later step, the lower edge portions of the sheets are substantially unsupported but provision is herein made through the use of a weighted roll to counteract any movement of the sheets at a downward angle.

Figure 12:
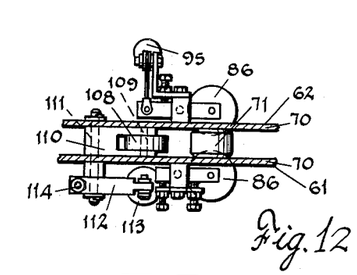
FIG. 12 is a horizontal sectional view taken on line 12—12 of FIG. 11.
Figure 13:
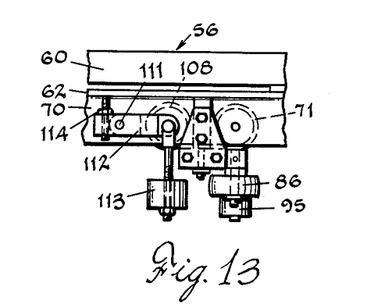
FIG. 13 is a fragmentary side view of another detail of the conveyor.

Thus, as shown in FIG. 6, the entry end of the upper track 56 is equipped with a roller 108 rotatably carried by an axle 109 on a bifurcated arm 110 supported on a shaft 111, the ends of which are journaled in the vertical legs 70 of the angles 61 and 62 previously described (FIG. 12). One end of the axle 111 is extended outwardly through the adjoining leg 70 to support a lever 112 which carries at one of its ends a weight 113. At the opposite end of lever 112, an adjustable set-screw 114 is provided. As viewed in FIG. 13, it will be noted that the set-screw is adapted to locate the lower peripheral surface of the roller 108 in the same horizontal plane as the rollers 71 on either side thereof. The weight 113 is therefore influential in resisting upwardly directed radial motion of the roller 108 but by reason of the set-screw on the opposite side of the shaft 111 will not cause the said roller to normally be situated below the plane along which the upper edges of the glass sheets are to be moved. It will also be noted in FIG. 6 that the roller 108 is spaced sufficiently from the sealing area B to exert a downward pressure on an upper corner of the unit, or that corner formed at the juncture of the wall portions 36 and 37, as the corner moves therepast during rearward movement of the unit. Since it would be objectionable to rigidly exert a rolling pressure on this upper corner surface as by substantially fixedly mounted rollers, the roller 108 is adapted to be moved upwardly. However, the weight 113 tends to resist such upward movement and consequently returns the roller 108 to its normal position.

A bridge 115 is located between the opposed ends of the lower track 53 and the lower track 55 and is adapted to be lowered and raised during the vertically directed movements of the sealing fixture generally designated by the numeral 116. Generally stated, this fixture includes a substantially rectangular frame 117 having a top wall 118, bottom wall 119 and vertically disposed side walls 120 and 121.

The bridge 115 comprises a channel base 125 with a web 126 and the legs 127 rising therefrom (FIG. 6). A plurality of rollers 128 are mounted on the upwardly directed surface of the web 126 by brackets 129. The bridge 115 is supported in its operative position, as in FIG. 6, by means of a series of weights through cables 130 that are secured to eyebolts 131 attached to the channel 125 in the opposite corners thereof (FIG. 4). Each cable is trained about bracket supported sheaves 132 and is passed through the bottom wall 42 to be connected to suitable weights 133 located in a foundation well. In FIG. 4, the bridge 115 is illustrated by full line in its upper operative position and by broken line in a lowered position to which it is moved during the descending motion of the sealing fixture 116. For this purpose, the bottom wall 119 of frame 117 is provided with downwardly directed pegs 134 having tapered ends 135 (FIG. 6). Each peg is located in vertically aligned relation to a socketed block 136 on the bridge 115. Each block is supported on a bracket 137 which is bolted to the opposed legs 127 of the channel base 125, such bolted connections 138 being provided through slots 139 and with the blocks being secured to the brackets by bolts 140 passed through slots 141. This enables each block to be adjusted longitudinally and transversely until the socket 142 therein is centered with respect to the respective tapered end 135 of a peg 134. Thus, when the fixture 116 is lowered, by means to be later described in detail, the pegs engage in the sockets and consequently cause the bridge to be pushed downwardly.

As this active pressure is relieved by upward movement of the fixture, the several weights 133 are adapted to maintain the engaged relation of the pegs and the socketed blocks until the rollers 128 are again aligned with the support rollers 71 on each side of said bridge. In order to insure that the bridge will be longitudinally positioned upon reaching its uppermost position, the ends thereof are equipped with centering devices 145; each comprising a tapered-end screw 146 carried in the outwardly directed end of a Z-shaped bracket 147 fixed to the undersurface of the channel web 126. As shown in FIG. 6, the tapered ends of the longitudinally aligned screws are adapted to enter socketed blocks 148 secured to the adjoining end of each of the channels 60 of lower tracks 53 and 55. As the bridge 115 is bodily raised by the weights 133 in an upwardly following action with the sealing fixture 116, its movement is arrested by entry of the screws 146 into their respective socketed blocks 148 at which time the plane across the top surfaces of the rollers 128 will coincide with the similar plane of the support rollers 71 on either side thereof.

Figure 15:
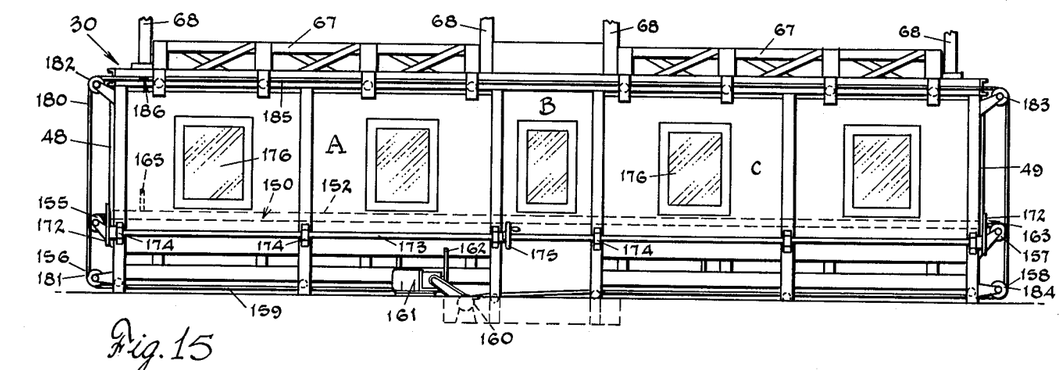
FIG. 15 is a side elevation of the assembly apparatus with a diagrammatic showing of the sheet pusher system therein.

To move a pair of glass sheets 32 and 33 along the conveyor 50 between the tracks 53 and 54 of the entry conveyor section 51 from the entry end of the preheating area A to and through the sealing area B and ultimately into the annealing area C between the tracks 55 and 56 of the exit conveyor section 52, a pusher arrangement is herein provided as indicated generally by the numeral 150 in FIGS. 4, 14 and 15. Generally speaking, the pusher comprises a shuttle or runner 151 which is slidably supported in a slotted sleeve 152. The tubular sleeve extends entirely through the furnace 30 and is supported at spaced points by roller-equipped brackets 153. By means shown in FIG. 15, a substantially endless cable 154, secured in the shuttle 151, is operated to pull the same through the sleeve. For this purpose, the cable 154 is trained about sheaves 155 and 156 (FIG. 16) at the front end of the furnace 30 and similar sheaves 157 and 158 (FIG. 17) at the opposite or rear end thereof. Substantially centrally of the furnace, the lower flight 159 of cable 154 between sheaves 156 and 158 is wound on a drum 160 that is suitably driven by a power unit 161. This unit is controlled by a clutch lever 162 to drive the drum 160 in either direction or to halt the same. The cable 154 thus moves in a substantially rectangular path and the upper flight 163 will be understood to pass through the sleeve 152 whereby the shuttle 151 will be moved between the ends of the furnace.

The shuttle 151 carries an arm 165 which projects outwardly through the longitudinally extending slot 166 (FIG. 14) of the sleeve 152 and, as shown in full line position in FIG. 4, is adapted to engage a pair of glass sheets along one or the other of their vertically disposed marginal edge portions. Also, for purposes to be more fully disclosed, the sleeve 152 is rotatable, from an external source, within the brackets 153 to engage the arm 165 at the edges of the slot 166 and swing the same upwardly to an inactive position indicated in broken line. When so located, the arm can be moved by the cable 154 along the sleeve 152 to position the end 167 thereof in engagement with the selected edges of any pair of glass sheets. Since the apparatus of this invention includes a single sealing area, the arm is employed to move a pair of glass sheets along the conveyor 50 from the entry to the exit end of the furnace and then be rapidly returned to engage a subsequent pair of glass sheets in the entry or preheating area of the furnace.

Figure 16:
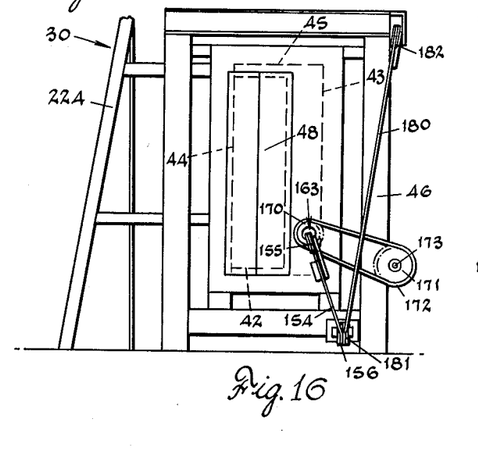
FIG. 16 is a front elevation of the apparatus.
Figure 17:
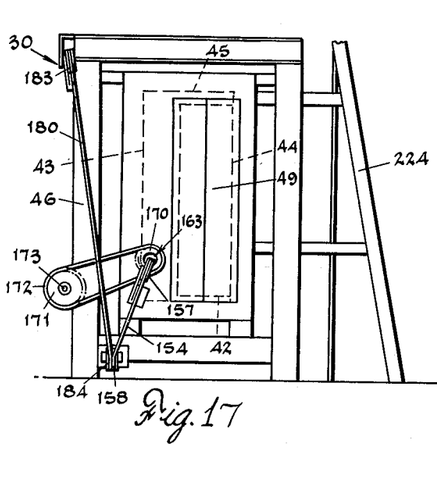
FIG. 17 is a rear elevation of the apparatus.

As shown in FIGS. 16 and 17, the sleeve 152 is extended through the opposite end walls of the furnace and its respective ends are equipped with sprockets 170. These sprockets, in each instance, are adapted to be rotated by sprockets 171 through chains 172 trained thereabout. The sprockets 171 are fixed to the ends of a shaft 173 supported on the framework 46 of the furnace by bearings 174 and provided in its medial area with a handwheel 175. Accordingly, upon turning of the shaft 173 by handwheel 175, the coupled sprockets 170 and 171 will cause rotation of the sleeve 152 between the full and broken line positions of the arm 165 as shown in FIG. 4.

While the position of the arm 165 can be observed through viewing windows 176 in the wall 43 of the furnace, a more convenient manner of observation is provided through the use of a second cable 180 that is trained about sheaves 181, 182, 183 and 184. As in the case of cable 154, the lower flight of cable 180 is wound on the drum 160 and the direction of particularly the upper flight 185 will coincide with that of the upper flight 163 of cable 154. The cable 180 in this upper flight 185 is provided with an area of some readily apparent color 186 (FIG. 15); said area being applied to the cable 180 in agreement with the position of the shuttle and of the arm 165 on cable 154. Consequently, as the arm is moved forwardly or rearwardly through the furnace, the colored area 186 will be moved in the same direction and to the same relative position to indicate to a furnace operator the actual position of the arm.

Now when a pair of glass sheets 32 and 33 have been suitably heated to a temperature above their strain point, as by heating sources 187, and while supported between the lower track 53 and upper track 54, the handwheel 175 is employed to swing the arm 165 downwardly through rotation of the sleeve 152. The lever 162 then is engaged to cause the drum 160 to move the cable 154 and consequently the shuttle 151 until the arm 165 engages the following vertically disposed trailing edges of the glass sheets. Thus, upon continued movement of the shuttle 151, the arm 165 will push said sheets along the conveyor system 50 toward and eventually through the sealing area B. That is to say, the sheets in their paired relation will be initially moved through the furnace until the leading edges thereof reach a point, indicated by the broken line L in FIG. 6, at which location the marginal edges of the vertical sides of the glass sheets can be properly acted upon by the sealing fixture 116 to first form the integral edge wall 36 therebetween.

Figure 19:
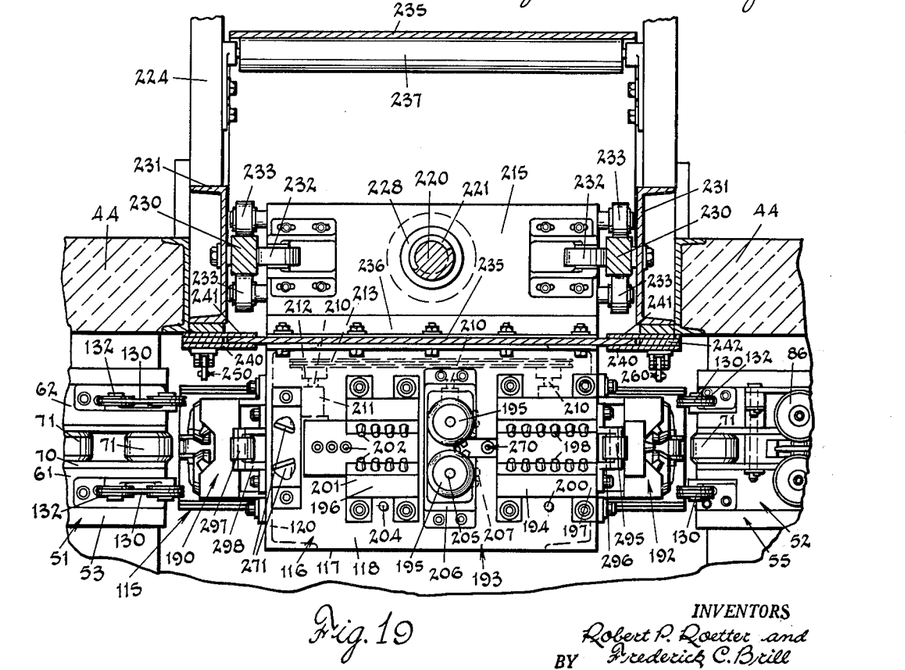
FIG. 19 is a horizontal sectional view of the sealing unit support structure taken on line 19—19 of FIG. 4.

As shown in FIGS. 4, 6 and 19, the sealing fixture comprises the substantially rectangular frame 117, formed of the wall channel members 118, 119, 120 and 121 on which a plurality of sealing units 190, 191, 192 and 193 are mounted. Each of these units generally includes a fusion burner head 194, a pair of forming rolls 195 and a polishing burner 196. Thus, the sealing unit 190 is located on the outwardly directed surface of the vertically disposed channel 120 (FIG. 6); the sealing unit 191 on the outwardly directed surface of the bottom channel 119; the unit 192 on the surface of the vertically disposed channel 121 and the sealing unit 193 on the horizontally disposed top channel 118 of the frame 117. While each unit is formed of similar functional elements, it will be appreciated that their individual arrangements will be governed by the side of the frame 117 on which they are mounted. That is to say, in each instance, the fusion burner 194 is positioned to initially act upon the margins of the glass sheets whether the sheets are moved relative to the sealing fixture or vice versa while the polishing burner is arranged therebehind to act in a finishing operation.

Each of the fusion burners 194 includes a body portion or casing 197 equipped with gas burner tips 198 and which casing is connected to a source of gas and oxygen supply through an individual mixing chamber 199 (FIG. 6). A pilot burner 200 is connected to a gas supply and serves to ignite the fusion burner 194 preparatory to the use thereof in forming an edge wall of the unit. Likewise, the fire-polishing burner 196 includes a body portion or casing 201 having gas burner tips 202 receiving a supply of gaseous fuel from a mixing chamber 203. A similar pilot burner 204 is provided for the burner 196. While the necessary conduits to each of the several mixing chambers 199 and 203 are not shown, it is to be understood that means is herein included for individually controlling the supply of fuel mixture to any of the sealing units whereby only the units to be actively employed will be temporarily connected to such sources. Likewise, thecasings 197 and 201 of the burners are connected to a source of coolant so as to reduce the tendency for them to become undesirably overheated.

Figure 20:
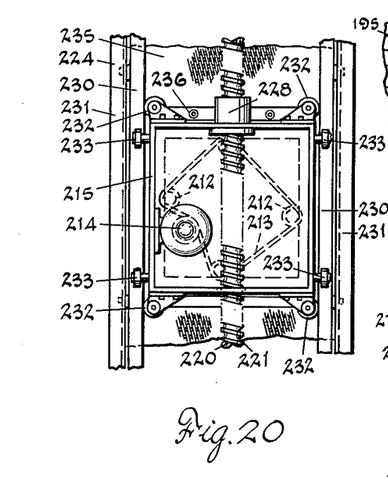
FIG. 20 is a vertical detail view of the opposite side of the support structure as viewed on line 20—20 of FIG. 4.

The several pairs of forming rolls 195 are each rotatably supported on shafts 205 journaled in a water-cooled housing 206. As shown in FIGS. 6 and 19, the ends of the shafts 205 project inwardly from their respective housings and channel members of the frame 117 and are equipped with spur gears 207 intermeshing with one another and thus causing the forming rolls 195 to rotate in counter directions to each other. One of the shafts 205 is further provided with a bevel gear 208 meshing with a bevel gear 209 on a shaft 210, journaled in a bracket 211 on an adjacent channel of the frame 117. The shaft 210, in each instance, at its opposite end mounts a sprocket 212 that is driven by a sprocket chain 213 entrained as shown in FIG. 20 about each of the several sprockets 212 and driven by a motor 214. The motor 214 is mounted within a housing 215 secured to the outwardly directed surface of the frame 117 (FIG. 20).

As hereinbefore mentioned, the sequential steps of the sealing operation can be carried out by first a vertically directed upward movement of the sealing fixture relative to the marginal edge portions of the adjoining vertical sides of the glass sheets to form the integral edge wall 36. The glass sheets are then moved forwardly beneath the sealing fixture whereby the marginal edge portions of the top edges of the sheets are fused together to form the edge wall 37 in continuation of the edge wall 36. When the sheets have been moved a pretermined distance ahead of the sealing fixture, the same is lowered and a third set of burners and forming rolls are employed to form the edge wall 38 during downward movement of the sealing fixture 116. In the final step of the sealing operation, the sheets 32 and 33 are moved rearwardly and across the top of the fixture 116 and the edge wall 39 is formed to complete the glazing unit 34. It is also during the formation of the wall 39 that the dehydration opening is provided for the unit.

Now, it is believed that having described the novel elements of the conveyor 50 and the operation of the pusher system 150, it is entirely clear that a pair of glass sheets will be freely supported for horizontally directed movement through the furnace and that this movement can be carried out in either direction. On the other hand, the sealing fixture 116 is adapted to be moved vertically through the sealing area B in alternating sequences to the movements of the glass sheets.

For this purpose, a vertically disposed shaft 220, having a "round" thread 221 formed in the annular surface thereof, is supported at its ends in bearings 222 and 223 supported by a structural framework 224. The end of the shaft 220 above the bearing 222 is equipped with a sprocket 225 which, by sprocket chain 226, is driven from a gear reduction motor unit 227 mounted on the framework. By means of a ball-type gear unit 228 mounted on the upper wall of the housing 215 and through which the round-threaded shaft 220 extends, the sealing fixture 116 is bodily movable upwardly or downwardly within predetermined limits as established by the vertical dimension of the glass sheets (FIG. 19).

The sealing fixture 116 is guided in its vertical movements by vertically disposed bars 230 mounted on the inwardly directed surface of channels 231 forming the upright elements of the framework 224. As best seen in FIGS. 19 and 20, the upper and lower walls of the housing 215 are provided with bracket mounted casters 232 while the vertical side walls thereof support pairs of casters 233 at the upper and lower corners thereof. The casters 232 engage the inwardly directed surfaces of the bars 230, the casters 233 similarly engaging the opposed surfaces of the bars on either side thereof. This manner of moving the sealing fixture relative to the guide bars 230 insures that the sealing units while in active use will be prevented from swaying either in a vertical or lateral plane. This is very important to the satisfactory formation of particularly the vertical edge walls since the burners and forming rolls must at all times be maintained steady and accurately equidistant from the surfaces of the glass sheets.

Provision is made in the wall 44 of the furnace to accommodate the vertical movement of the sealing fixture 116 and at the same time prevent the intrusion of outside colder air into the relatively highly heated atmosphere in the chamber 47 of the furnace. To this end, a flexible metal curtain 235 is employed with the ends thereof being secured to the upper and lower surfaces of the sealing fixture by means of clamping plates 236. The curtain is supported on a plurality of rolls 237 suitably journaled on the framework 224. Since the curtain must be substantially impervious to entry of air, as above mentioned, one form of metallic material is a woven wire cloth which is provided with a coat of heat-resistant paint on its inwardly directed surface into or onto which small particles of asbestos are added to fill the interstices of the wire. As seen in FIG. 4, the curtain 235, in passing about the several rolls 237, describes a substantially rectangular path of movement and that the outer flight thereof could prevent ready access to the exposed portions of the sealing fixture and particularly those within the housing 215. To remedy this situation, the curtain is split as at 238 and normally the ends interconnected by a length of wire 239. Accordingly, when adjustments are to be made, the wire 239 is withdrawn whereupon the curtain 235 may be parted and the sealing fixture reached with ease. To seal the edges of the curtain 235 and guide the same, vertically disposed plates 240 and 241 are provided that are separated by a spacer 242 and secured to the channels 231 of the framework 224 as shown in FIG. 19.

In carrying out the method of this invention, a pair of glass sheets 31 are introduced into the furnace chamber 47 through the entry door 48 and are received on the supporting rolls 71 of the entry conveyor section 51; spaced apart in parallel relation by the rolls 73 and maintained against the spacing rolls 73 by the weighted rollers 86. During the location of the glass sheets in this manner, it is to be appreciated that the arm 165 of the pusher system 150 will be raised in its inactive position as was shown in broken line in FIG. 4. Thus, with the sheets properly arranged, the handwheel 175 is turned to rotate the shaft 173 and consequently the slotted tube 152 to lower the pusher arm. Upon engagement of the power unit 161 by the lever 162, the drum 160 will cause the cable 154 to advance the arm along the slot 166 until the trailing edges of the glass sheets are engaged whereupon continued movement will move the sheets forwardly to a position indicated at "a" in FIG. 3. This generally indicates the position in which the first portion 36 of the edge wall 35 of the unit 34 is formed.

To positively locate the leading edges of the glass sheets, a stop gauge 250 is provided. As seen in FIGS. 4, 6 and 18, this gauge includes an arm 251 pivotally mounted on a bracket 252 secured to an adjacent plate 240. The gauge arm 251 is adapted to be swung downwardly to its active position, as in FIG. 18, by means of a suitably insulated solenoid or like device 253, the movable member 254 of which is attached to the arm by a link 255. When the arm has been engaged by the leading edges of the sheets, control of the device 253 can be released and a spring 256, connected to the arm and the upper end of bracket 252, urges said arm upwardly to a position indicated in broken line in FIG. 18.

Figure 23:
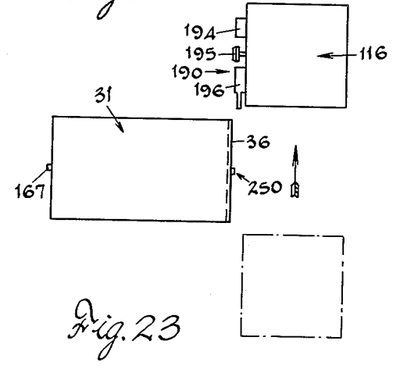

Suitable valves in the fuel supply lines to the fusion burner 194 and polishing burner 196 of the sealing unit 190 are opened whereupon flames will be created at the tips 198 and 202 by the pilot burners 200 and 204 respectively. In continuous use of the sealing apparatus, the motor 214 is operated to drive the several sprockets 212 through chain 213 so that the pairs of forming rolls 195 will normally be in operation. Now upon energizing the motor unit 227, the threaded shaft 220 will be turned to cause the gear unit 228 to raise the fixture 116 as shown in FIG. 23. The marginal edge portions of the leading vertical sides of the sheets will thus be subjected to the heat of the flames of the fusion burner 194 to produce a semi-plastic condition therein and the upwardly carried pair of forming rolls 195 then progressively receive these softened edge portions to press them into fusion contact with one another. Emerging from between the rolls, the newly formed edge wall is fire-polished by the burner 196 to remove any mars or blemishes caused by the rolls. When the sealing operation has been effected entirely across the vertically disposed side edges to form the wall portion 36, the fuel supply is closed to the burners 194 and 196 and the upward movement of the fixture 116 is halted.

As hereinabove set forth, during upward movement of the sealing fixture 116, the conveyor bridge 115 will be caused to follow therewith due to the influence of the several weights 133 until the locator screws 146 are engaged in the blocks 148. This will locate the rollers 128 on the bridge 115 to support the sheets 32 and 33 as they are moved through the sealing area B between the lower conveyor tracks 53 and 55. Preferably a suitable form of limiting stop (not shown) may be employed to determine the upper limit of the fixture's movement since this will also position the sealing unit 191 at the desired height to form the top portion of the edge wall. Preparatory to carrying out the second sealing step, the fuel supply to the burners 194 and 196 of unit 191 is opened and the pilot burners employed to produce flames at the tips 198 and 202.

As shown in FIG. 24, the second portion 37 of the edge wall 35 is produced during forward movement of the glass sheets as they are pushed along the entry conveyor section 51 and enter the conveyor section 52 in the area C of the furnace. Previously it was mentioned that the lower track 55 of this section 52 of the conveyor 50 was equipped with spacing rolls 75 that were adapted to be lowered and raised by the cylinder 104 through the cooperation of the rod 103 and link 102. The reason for using the several spacing rolls in the entry end of the lower track 55 is to enable the formation of glazing units according to the method of this invention but not entirely following the sequential steps thereof as are herein described. Accordingly, it is contemplated that the several edge portions of a pair of glass sheets can also be sealed together by first moving the upper marginal portions of the sheets through the sealing unit 191 to form the top wall portion 37. In this event, it is desirable to maintain the bottom edges in spaced relation to one another on the lower track 55 of the exit section 52 as well as when they are supported on the lower track 53 of the entry section 51.

However, in the present instance, when the sheets are moved forwardly by the pusher arm 165, as herein described, the lower edges or corners of the sheets at the wall portion 36 will have been sealed together and the spacing rolls 75 of the track 55 will not be found necessary. Accordingly, the cylinder 104 will have been employed to lower the plurality of spacing rolls 75 to the inactive position.

Now, as the arm 165 advances the sheets 32 and 33, the upper margins thereof pass through the sealing unit 191 and are heated by the fusion burner 194, pressed together in fusion contact by the forming rolls 195 and the outer surfaces of the wall portion 37 will be polished by the flames of the burner unit 196. When the sheets have been entirely received on the exit conveyor section 52, as indicated at "b" in FIG. 3, the motor 161 is disengaged and the sleeve 152 is rotated to remove the arm 165 from contact with the following edges of the sheets.

Figure 25:
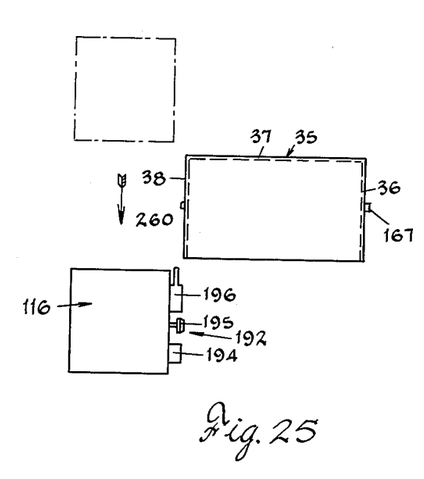

As illustrated in FIG. 25, the third wall portion 38 is formed along the marginal edge portions of the trailing vertical edges of sheets 32 and 33 during the downward movement of the sealing fixture 116 and while the unit 192 is actively employed. To locate these trailing edges properly, the shuttle 151 by cable 154 advances the arm 165, in its inactive position, until said arm is substantially in registry with the leading edges of the sheets or the wall portion 36 formed therebetween. After lowering the pusher arm to its active position by the handwheel 175, the lever 162 is employed to reverse the direction of movement of the cable 154 and arm 165 to the end that the pair of glass sheets will be moved rearwardly toward the sealing area B and until the then leading sheet edges come into contact with a stop gauge 260. This positions the said edges in alignment with a line "R" indicating the downward path of movement of the sealing unit 192. The details of the stop gauge 260 are similar in all respects to those of the stop gauge 250 as illustrated in FIGS. 6 and 18. As well, the gauge 260 is lowered until the edges of the sheets engage the same and is then lifted by the spring 256 to its inactive position.

The sealing unit 192 is put into operation and the motor 227 is energized to move the sealing fixture 116 downwardly, as shown in FIG. 25 and thus seal the sheets together to form wall portion 38 in the same manner as described above.

It will be recalled that during downward movement of the fixture 116, the pegs 134 engage the sockets in the blocks 136 and thereby move the bridge 115 downwardly, against the influence of the several weights 133, to a position indicated in broken line in FIG. 4. When the fixture 116 and bridge 115 arrive at their lowered positions, the fuel supply to the unit 192 is closed and operation of the motor 227 halted. Here again a limit gauge may be provided to determine the lower position of the sealing fixture which will serve to locate the several elements of the sealing unit 193 to properly act upon the lower or bottom edges of the glass sheets.

The sealing unit 193, in addition to the fusion burner 194, forming rolls 195 and polishing burner 196 (FIG. 19), includes a dehydration hole forming device, generally designated by the numeral 270, and a pair of air jets 271. The hole forming device 270 is situated between the fusion burner 194 and forming rolls 195 and is adapted to operate during the sealing of the bottom edges of the sheets to insert the tubular element 41 into and between the spaced edges and support the same until the edges pass between the forming rolls 195 when the element or tube 41 is permanently sealed into the finished edge wall.

Figures 21, 22:
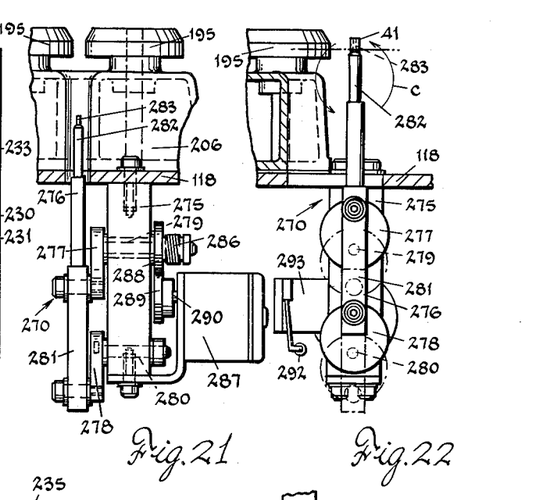
FIG. 21 is an elevational view of the dehydration hole forming device.
FIG. 22 is an elevational view of the device of FIG. 21.

As shown in FIGS. 21 and 22, the dehydration hole forming device 270 includes a base 275, suitably secured on the inner surface of the channel 118, and a tube supporting arm 276. The arm is mounted on rotary members or cranks 277 and 278 that are in turn supported in axial relation on shafts 279 and 280 journaled in the base 275. The arm 276 comprises a mounting part 281 and tube supporting part 282 which terminates in a tip 283 having a diameter slightly less than the bore of the tubular element 41. The mounting part 281 of the arm is supported on the cranks 277 and 278 by bolts 285 in eccentric relation to the axis of rotation of the cranks as defined by the axes of the shafts 279 and 280. This causes the arm 276 and particularly the tip 283 thereof to traverse a circular path "c" upwardly from the tip's position in FIG. 21 to the upper position of FIG. 22. During this circular movement of the tip and particularly the sector thereof indicated in FIG. 22, the tip carrying a tube 41 will enter between the sheets and move in substantially timed relation therewith until those immediately affected areas of the sheets enter the pass between the forming rolls when the tubular element has become adhered sufficiently to the softened glass surfaces that the tip can be lowered therefrom when it is moved through the downwardly directed portion of its circular movement.

The shafts 279 and 280 are caused to rotate their respective cranks 277 and 278 during engagement of a so-called "one-cycle" clutch 286 and operation of a motor unit 287. To this end, the fixed element of the clutch is secured to the shaft 279 while the free element is associated with a spur gear 288. Gear 288 is meshed with a drive gear 289 mounted on the output shaft 290 of the unit 287.

Operation of the motor unit 287 is controlled by a limit switch (not shown) that is engaged when a corner area of the sheets is approaching and passing through the fusion burner 194 of the sealing unit 193. On the other hand, a limit switch 292 mounted by bracket 293 on the base 275 is adapted to be engaged by the crank member 278 to open the circuits to the motor unit 287 when the one cycle of operation has been completed. And, according to the preferred method of this invention, at the start of each sealing operation, the fixture 116 is in its lowered position so that it is possible to place a tubular element or grommet 41 on the tip 283 of arm 276.

Preparatory to sealing of the bottom edges of the glass sheets thereby completing formation of the edge wall 35, the cylinders 100 and 101 are operated to move the spacer rolls 75 to their inoperative positions through their associated links 84 and 98 and rods 85 and 99 respectively. This action lowers the spacer rolls 75 of the lower track 53 (FIG. 6) and raises the rolls 75 of the upper track 54 since their function of maintaining the sheets in spaced parallel relation along their upper and lower marginal portions is no longer necessary. It may also be noted that the adjusting set-screw 96 associated with each of the weighted rollers 86 will offset the influence of the weights 95 normally tending to urge the rollers inwardly so that said rollers will be maintained apart a separated distance equal to the total thicknesses of the glass sheets and the air space to be created therebetween.

The valves in the fuel supply lines to the fusion burner 194 and polishing burner 196 of the sealing unit 193 are opened to create flames at the tips 198 and 202 by the associated pilot burners. Also, a valve is employed to connect the jets 271 to a source of air pressure. At this time, upon engaging the power unit 161 by clutch lever 162, the drum 160 will be turned to draw on the cable 154 thereby moving the pusher arm 165 toward the preheating area A and more particularly the sheets 32 and 33 rearwardly toward and through the sealing unit 193 thereby to form the edge portion 39. At a spaced distance inwardly from the leading corner of the sheets, or from the trailing corner of the sheets, the dehydration hole forming device 270 is activated whereby a tubular element 41 is inserted between the edges of the sheets and pressed therebetween as this area of the edges enters the pass between the forming rolls. Since the newly formed edge wall is substantially instantaneously received on the support rollers 71 of the lower track 53 in the entry conveyor section 51, the air jets 271 operate to accelerate cooling of the glass surfaces to a temperature at which they will carry the weight of the glazing unit without marring.

As previously stated, the lower portion 39 of edge wall 35 is formed as the partially completed unit is moved rearwardly across and above the sealing unit 193. During such movement, the lower edges of the sheets will be substantially unsupported between the last roller 71 on the lower track 55 and the first roller on the lower track 53. In this situation, the unsealed edges of the glass sheets are carried by the rollers of the lower track 55 and the sealed portion 39 of the wall 35, as it is progressively formed by the unit 193, is moved toward and onto the lower track 53. To provide support for the sealed or unsealed edges of the sheets as they move across the area spanned by the sealing unit, a pair of rollers are mounted on the sealing fixture and, more particularly, on the respective upper ends of the vertically disposed channels 120 and 121 of the frame 117. Thus a roll 295 is mounted by bracket 296 on the channel 121, adjacent the fusing burner 194 of the unit 193 and a roller 297 is similarly mounted by bracket 298 on channel 120, adjacent the pair of air jets 271. Accordingly, as the newly-formed edge wall is moved between the air jets and the surface thereof is cooled by the blasts therefrom, the surface is received on the roller 297 which operates to furnish a rolling type of support until, during the continuous movement of the sheets, the edge wall surface is carried onto the first roller 71 of the lower track 53. Since the edge surface, although somewhat cooled by the air jets 271, is susceptible to marring as weight of the unit is increasingly carried thereon, the aforementioned roller 108 operates to exert a light pressure on the surface of the upper portion of the edge wall as the upper corner of the following edge of the sheets approaches the sealing unit. The pressure of the roller 108, as induced by the weight 113, tends to counteract the weight of the sheets as the lower edges move through the unit 193. This is particularly true as the leading lower corner of wall portion 39 moves through the air jets and across the roller 297 and until it can be received on the first and next rollers 71 of the lower track 53.

When the completed glazing unit has been moved by the pusher arm 165 entirely onto the lower track 53 of the entry conveyor section 51, the handwheel 175 is turned to effect rotation of the sleeve 152 and consequently raise the pusher arm 165 to its upper inactive position. While so maintaining the arm, the motor 161 is activated to continue movement of the shuttle 151 and arm toward the front end of the furnace until a distance greater than the length of the unit has been traversed, at which time the motor is stopped. This is to reverse the position of the arm from one end of the glazing unit to the other end whereby when the arm 165 is again lowered it will be adapted to move the unit forward or toward the cooling end of the chamber 47. Thus, upon resuming operation of the motor 161, the arm 165 will be caused to move the unit forwardly from the lower track 53 and upper track 54 to the respective tracks 55 and 56 of the exit conveyor section 53 and until the unit is received on support rollers 105 in the annealing area C of the furnace, as shown in FIG. 3.

While not herein shown, it is contemplated that an annealing tunnel will be placed adjacent the area C with access through the door 49 to the end that each glazing unit will be initially received in the said area and then in sequence transferred into an annealing chamber where it will gradually cool to normal temperature. This is believed to be an obvious adjunct to the novel features of the invention described hereinabove.

It was also previously mentioned that while the method of this invention and the apparatus for producing all-glass multiple sheet glazing units as herein described can be carried out and said apparatus employed to form a vertical edge, a top edge, an opposite vertical edge and finally a bottom edge of a glazing unit, it is entirely possible to carry out the method in an alternative sequence of operation.

In completing the method of this invention, it is of course contemplated to raise the arm 165 to its inactive position and move the same rearwardly to a location adjacent the entry door 48 preparatory to the edge sealing of a subsequent pair of sheets.

When cooled to normal temperature, the air in space 40 within the unit 34 is withdrawn and replaced with dehydrated air or other gases, through the opening provided by the tubular element 41. When the outer end of the element 41 is closed, the unit will be permanently hermetically sealed for its intended use.

It is to be understood that the form of the invention herewith shown and described is to be taken as an illustrative embodiment only of the same, and that various changes in the shape, size and arrangement of parts, as well as various procedural changes may be resorted to without departing from the spirit of the invention.

We claim:
1. In apparatus for producing all-glass multiple sheet glazing units, the combination of, a furnace having a sealing area, means supporting pairs of glass sheets in vertical, parallelly spaced, face-to-face relation for movement along a predetermined path extending through said furnace, a sealing fixture mounted in said sealing area to move back and forth along a second path normal to said predetermined path, sealing means mounted on said fixture to engage marginal edges of said sheets, conveyor means moving said sheet intermittently back and forth along said predetermined path and past said sealing means, means moving said sealing fixture back and forth along said second path in alternate sequence to the movements of said conveyor means whereby in spaced sequences the sealing means engage marginal edge portions of said sheets around the entire periphery thereof to form a continuous edge wall.

2. In apparatus for producing all-glass multiple sheet glazing units as defined in claim 1, in which said sealing fixture comprises a substantially rectangular frame, fusion burners mounted on each side of said frame, forming rolls mounted adjacent each of said fusion burners, and power means rotating said forming rolls, said forming rolls being operable to progressively press the marginal edge portions of said sheets softened to a semi-plastic condition by said fusion burners together upon relative movement between said marginal edge portions and said sealing mechanism.

3. In apparatus for producing all-glass multiple sheet glazing units as defined in claim 1, in which said means supporting said pairs of glass sheets comprise rollers journaled to rotate about fixed axes extending normal to said predetermined path and spaced apart along said predetermined path adjacent the upper and lower edges of said pairs of glass sheets, spacing rollers journaled to rotate about axes parallel to said fixed axes and having a flange portion integral therewith and means shifting said spacing rollers between an operative position wherein said flange portion projects between said glass sheets and an inoperative position wherein said flange is retracted out of said space.

4. In apparatus for producing all-glass multiple sheet glazing units as defined in claim 1, a conveyor means comprises an endless cable having a substantially horizontal run extending through said furnace and adjacent said predetermined path, an elongated tube having a slot extending along the length thereof and being telescoped on said horizontal run of said cable, an arm fixed to said cable and projecting outwardly through said slot and means driving said cable endwise to move said arm back and forth along said slot, said tube being journaled to turn between a first position wherein said arm projects through said slot and across said predetermined path to engage a vertical edge portion of said sheets and a second position wherein said arm is swung away from said predetermined path.

5. In apparatus for producing all-glass multiple sheet glazing units from substantially rectangular sheets of glass, the combination of, a furnace having a sealing area therein, means supporting pairs of glass sheets on edge in a vertical position and arranged in a parallel, spaced, face-to-face relationship for movement endwise along a predetermined path extending through said furnace, a sealing fixture disposed in said sealing area and mounted to move along a second path extending normal to said predetermined path, sealing mechanism mounted on said fixture, conveyor means moving said pairs of sheets intermittently back and forth along said predetermined path and stopping the endwise movements of said sheets at a forward position wherein one vertically disposed edge portion of the sheets lies in said second path and a rearward position wherein the opposite vertical edge portion of the sheets lies in said second path and means moving said sealing fixture intermittently back and forth along said second path in alternate sequence with the movements of said conveyor means and when said sheets are stopped in said forward or said rearward positions, said sealing mechanism engaging the top edge portion of said sheets upon movement in one direction of said conveyor means and the bottom edge portion upon movement of said conveyor means in the opposite direction and with the sealing mechanism being advanced along one vertical edge portion of the sheets upon movement of said fixture in one direction and along the opposite vertical edge portion upon movement of the fixture in the opposite direction.

6. In a method of producing an all-glass multiple sheet glazing unit, the steps of, supporting a pair of substantially rectangular glass sheets arranged in spaced, parallel, face-to-face relationship in a vertical position for movement along a predetermined horizontal path, preheating said sheets to a temperature above the strain point of glass during said movement, interrupting the movement of the sheets along said path, moving a sealing fixture vertically upwardly along the leading edge portions of the sheet thereby to progressively fuse said edge portions together, discontinuing the vertical movement of said sealing fixture when the latter is adjacent the uppermost edge portions of the sheets, moving said sheets along said horizontal path beneath said sealing fixture to fuse the upper edge portions of the sheets to one another, discontinuing the movement of said sheets with said sealing fixture adjacent the trailing edge portions of said sheets, moving said sealing fixture vertically downwardly along the trailing edge portions of said sheets thereby to fuse said trailing edge portions together, discontinuing the downwardly movement of said sealing fixture when the latter is adjacent the lowermost edge portions of the sheets and then moving said sheets backwardly along said horizontal path over said sealing fixture to fuse the lowermost horizontal edge portions of said sheets together.

References Cited by the Examiner

UNITED STATES PATENTS

| 1,448,351 | 3/23 | Kirlin | 65—34 |
| 2,116,297 | 5/38 | Aurien | 65—41 |
| 2,193,393 | 3/40 | Danner | 65—58 |
| 2,521,048 | 9/50 | Day | 65—58 |
| 2,761,248 | 9/56 | Cowley et al. | 65—152 |
| 2,761,249 | 9/56 | Olson et al. | 65—152 |
| 2,968,895 | 1/61 | Kilian et al. | 65—68 |
| 2,977,722 | 4/61 | Mazzoni | 65—23 |
| 2,995,869 | 8/61 | Cowley | 65—58 |

FOREIGN PATENTS

| 546,939 | 10/56 | Belgium. |
| 556,996 | 2/57 | Italy. |

DONALL H. SYLVESTER, *Primary Examiner.*

ALLEN B. CURTIS, WILLIAM B. KNIGHT,
*Examiners.*